United States Patent
Wang et al.

[19]

[11] Patent Number: 6,125,137
[45] Date of Patent: Sep. 26, 2000

[54] APPARATUS AND METHOD FOR PERFORMING A SIGNAL SEARCH IN A COHERENT WIRELESS COMMUNICATION SYSTEM

[75] Inventors: Michael Mao Wang, Carpentersville; Tyler Brown, Mundeline, both of Ill.

[73] Assignee: Motorola, Inc., Schaumburg, Ill.

[21] Appl. No.: 09/151,610

[22] Filed: Sep. 11, 1998

[51] Int. Cl.⁷ .............................. A61F 2/06; H04L 27/30
[52] U.S. Cl. ......................... 375/148; 370/320; 370/335; 370/342; 375/144
[58] Field of Search .................................. 375/130, 140, 375/147, 148, 149, 316, 347, 349; 370/335, 320, 342, 209

[56] References Cited

U.S. PATENT DOCUMENTS

| | | | |
|---|---|---|---|
| 5,654,979 | 8/1997 | Levin et al. | 375/140 |
| 5,703,902 | 12/1997 | Ziv et al. | 375/130 |
| 5,764,687 | 6/1998 | Easton | 375/140 |
| 5,867,527 | 2/1999 | Ziv et al. | 375/140 |
| 5,881,056 | 3/1999 | Huang et al. | 370/335 |
| 5,956,367 | 9/1999 | Koo et al. | 375/140 |
| 5,987,016 | 11/1999 | He | 370/335 |
| 6,009,089 | 12/1999 | Huang et al. | 370/342 |

*Primary Examiner*—Chi H. Pham
*Assistant Examiner*—Bryan Webst
*Attorney, Agent, or Firm*—Richard A. Sonnentag; Sayed Hossain Beladi

[57] ABSTRACT

A base station receiver assembly (400) for performing a signal search, which operates in a coherent code division multiple access (CDMA) wireless communication system conveying a mobile communication signal is disclosed. The assembly (400) includes a multipath signal searcher (200), a receiver (300), and an energy adjustment generator (490). The energy adjustment generator operates to combine an energy metric (241) from the multipath signal searcher (200) with a symbol match count (447) to yield a signal (448) for weighting inputs to a finger manager (260). The symbol match count (447) is based on a count, resulting from a comparison of a number of times an output from the multipath signal searcher (200) matched an output from the receiver (300). The symbol match count (447) is representative of a likelihood that a time offset selected by the finger manager (260) corresponds to a time offset of the mobile communication signal (107).

18 Claims, 3 Drawing Sheets

100

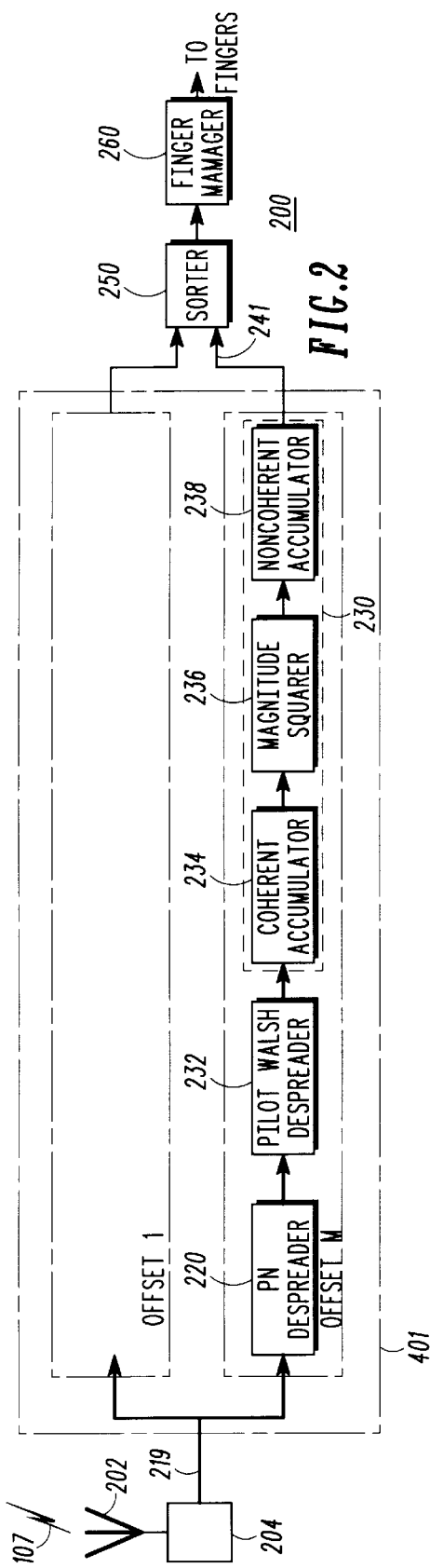
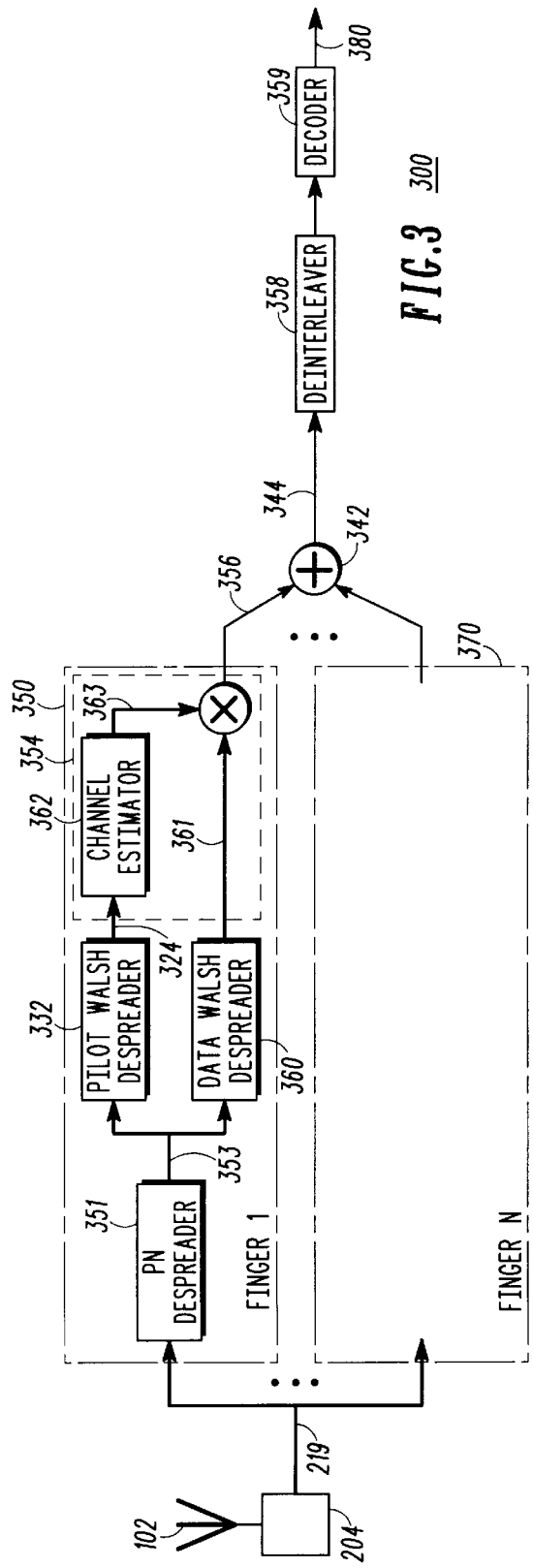
FIG.2
FIG.3

APPARATUS AND METHOD FOR PERFORMING A SIGNAL SEARCH IN A COHERENT WIRELESS COMMUNICATION SYSTEM

FIELD OF THE INVENTION

The present invention relates generally to wireless communication systems and, more particularly, to a method and apparatus for performing a signal search in a coherent wireless communication system.

BACKGROUND OF THE INVENTION

Communication systems that utilize coded communication signals are known in the art. One such system is a direct sequence code division multiple access (DS-CDMA) cellular communication system, such as set forth in the Telecommunications Industry Association Interim Standard 95B (TIA IS-95B) herein after referred to as IS-95. In accordance with IS-95, the coded communication signals used in the DS-CDMA system comprise spread spectrum signals which are transmitted in a common 1.25 MHz bandwidth channel between mobile stations and base transceiver stations (BTS) located at base sites of the wireless communication system. Each 1.25 MHz bandwidth portion of the radio-frequency (RF) spectrum, or 1.25 MHz bandwidth channel, carries spread spectrum signals centered around a particular carrier frequency and is commonly referred to as a narrowband DS-CDMA channel. Recovery of the spread spectrum signals by the BTS is enabled via the use of non-coherent demodulation techniques.

In addition, there are numerous international standards proposals which suggest a coherent wideband CDMA transmission signal configuration. Evolution from the current narrowband CDMA signal transmission configuration, which is designed to carry voice and low rate data, has been driven by a need to deploy higher rate circuit and packet data services in a wireless communication environment. In order to accommodate the higher rate services, wideband CDMA signal transmission configurations have been proposed in which a coherent demodulation scheme is utilized. The coherent demodulation scheme is enabled via the use of a pilot signal added to the uplink signal path from the mobile station to the BTS. The pilot signal is used by a receiver multipath signal searcher in the BTS to enable differentiation between transmitted mobile station signals and unwanted noise interference.

A mobile communication signal transmitted from a mobile station to a BTS, may be reflected off of nearby scatterers, such as buildings, and result in multipath propagation of the transmitted signal. These reflections produce replicas, typically referred to as multipath replicas, of the originally transmitted signal which arrive at a base site receiver with various power levels at various times. The power levels are determined by propagation distances traveled by the multipath replicas. Upon receipt by the BTS, the originally transmitted signal and its multipath replicas are filtered, despread, recombined and decoded to yield the desired voice or data signal.

The ability of a spread spectrum system to resist noise interference, commonly referred to as narrowband interference, is determined in part by the processing gain of the system. Wideband CDMA system configurations inherently possess a higher processing gain (a ratio of occupied bandwidth to an information rate), when compared to narrowband CDMA systems. The higher processing gain has the advantage of increased noise immunity as well as higher signal resolution due to additional multipath components available in wideband CDMA systems.

Unfortunately, multipath component, or signal searching in a wideband wireless communication system is less effective when compared with multipath component searching in an narrowband (IS-95) wireless communication system. First, a high energy single signal typically resolved in an IS-95 wireless communication system becomes multiple low energy signals, resolved in a wideband wireless communication system. Hence, a wideband wireless communication system has a lower multipath signal detection probability due to less available signal energy per multipath signal. Second, in a wideband wireless communication system, a reduced chip period for a given search window yields a larger number of pn offsets to be searched. Consequently, the probability that a pn-offset within the search window may be erroneously detected is increased, thereby yielding a higher overall probability of false alarms. Accordingly, a multipath searcher with substantially more sensitivity is required in a wideband wireless communication system in order to overcome the problems associated with lower multipath signal detection and higher false alarms in the BTS.

Therefore, a need exists for a method and apparatus to provide a signal search capability within a wideband wireless communication system that is easy to implement and overcomes low multipath signal detection and increased false alarm problems inherent in the prior art design.

BRIEF DESCRIPTION OF THE DRAWINGS

FIG. 2 is a block diagram of a prior art multipath signal searcher 200 used to identify time offsets associated with mobile communication signals and their multipath replicas.

FIG. 3 is a partial block diagram of a prior art RAKE receiver used to demodulate the mobile communication signal at the time offsets selected by multipath signal searcher 200.

DETAILED DESCRIPTION OF THE PREFERRED EMBODIMENT

Figure 1:
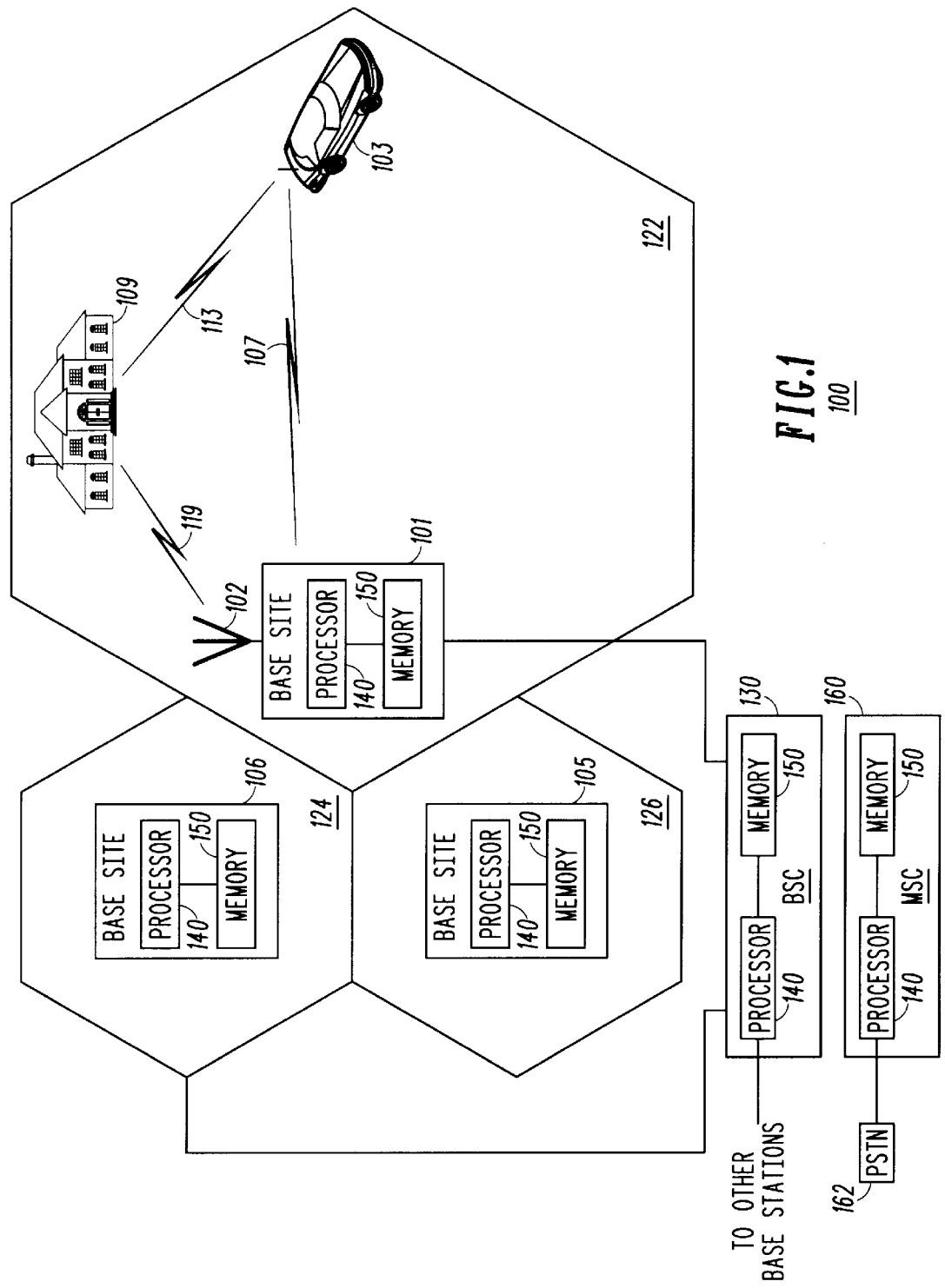
FIG. 1 depicts a typical prior art wideband CDMA wireless communication system 100.

An improvement for tracking a mobile communication signal that operates in a coherent code division multiple access wireless communication system is presented. This approach employs a multipath searcher in communication with a base site RAKE receiver. According to a preferred embodiment of the present invention, the multipath searcher utilizes a comparison metric, or symbol match count, and an existing energy metric to adjust tracking operation in the base site RAKE receiver.

Stated specifically, a base station receiver assembly 400 for tracking a mobile communication signal, which operates in a coherent code division multiple access (CDMA) wireless communication system conveying a mobile communication signal, is described herein. The base station receiver assembly 400 includes a multipath signal searcher 200, a receiver 300, and an energy adjustment generator 490. The energy adjustment generator 490 operates to combine an energy metric 241, resulting from multipath signal searcher 200, with a symbol match count 447 in order to generate a signal 448. Signal 448 is composed of an adjusted energy value that represents an improved energy metric when compared to an energy metric possible in prior art multipath signal searchers such as multipath searcher 200. Symbol match count 447 provides the additional information necessary to provide the improved energy metric that subsequently directs the selection of pn-offsets used in receiver finger demodulation. Symbol match count 447 is the result of a comparison of a number of times an output from multipath signal searcher 200 and an output from receiver 300 are identical. It is therefore representative of a likelihood that a time offset selected by finger manager 260 corresponds to a valid time offset of mobile communication signal 107.

Turning now to the drawings, wherein like numerals designate like components, FIG. 1 depicts a typical prior art coherent CDMA wireless communication system 100. Coherent CDMA wireless communication system 100 preferably comprises a direct spread code division multiple access (DS-CDMA) cellular communication system, although a multi-carrier CDMA cellular communication system may be suitable.

Coherent CDMA wireless communication system 100 includes base sites 101, 106, 105 providing service to coverage areas 122, 124, and 126 respectively, and one or more mobile stations although only one mobile station 103 is shown. Base sites 101, 105 and 106 include, among other things, a processor 140 and a memory 150. Base site 101 includes a transceiver (not shown) which transmits coded communication signals to, and receives coded communication signals from, mobile station 103 via an antenna 102.

A receiver, preferably a RAKE receiver within the transceiver provides tracking capability of incoming multipath coded communication signals from mobile stations, the construction and operation of RAKE receivers being well known in the art. Similarly, mobile station 103 includes a transceiver that transmits coded communication signals to, and receives coded communication signals from, base site 101 within a coverage area 122. Coded communication signals transmitted from mobile station 103 are comprised of a pilot signal and a data signal. The pilot signal, which enables use of coherent demodulation techniques by a base site is comprised of a bit stream represented by +1's, while the data signal representative of voice, video, or data, is comprised of a bit stream represented by +1's and −1's.

Base sites 101, 105, and 106 are coupled to a base station controller (BSC) 130, which includes, among other things, a processor 140 and a memory 150, and which is in turn coupled to a mobile switching center (MSC) 160, also including a processor 140 and a memory 150. MSC 160 is coupled to a public switched telephone network (PSTN) 162 using known techniques.

Mobile communication signal 107 is conveyed between mobile station 103 and base site 101 through a radio frequency (RF) channel. The RF channel includes a reverse-link (mobile station 103 to base site 101) and a forward-link (base site 101 to mobile station 103). Mobile communication signal 107 includes an pseudo-random short code (not shown) associated with and assigned by base site 101, and a mobile unique pseudo-random long code mask (not shown). The inclusion of the codes results in a mobile unique pseudo-random noise sequence (PN sequence) for mobile station 103, which is identifiable by the RAKE receiver at base site 101.

Signals 119 and 113 are multipath replicas of mobile transmitted signal 107, due, for example, to reflections of mobile communication signal 107 off of scatterers such as building 109. Multipath replica 119 of mobile communication signal 107, and mobile communication signal 107 arrive at base site 101 at different times, time offset from a reference time, commonly referred to as a pn-offsets. The different pn-offsets are the result of varying propagation distances.

FIG. 2 is a block diagram of a prior art multipath signal searcher 200 used to identify time offsets associated with mobile communication signals and their multipath replicas. A signal energy value associated with a particular time offset is used by multipath signal searcher 200 to select a pn-offset associated with an appropriate multipath signal for demodulation by a receiver. In order to demodulate the transmissions from a particular mobile station, the base site receiver must first differentiate the multipath signals associated with a particular mobile station from other multipath signals as well as simple noise associated with other nearby transmitters. This identification of a particular mobile station's multipath signals, including their locations with reference to a time offset or a pn-offset, begins as an antenna, or signal search. In digital wireless communication systems, the pn-offset is measured in increments of time referred to as pseudorandom noise (PN) chips. Each PN chip is approximately equivalent to the inverse of the occupied bandwidth, e. g. 814 nanoseconds (ns) for a 1.2288 MHz system and 271 ns for a 3.866 MHz system.

In a sectorized antenna system, there are generally two antennas for each of the sectors. For a typical time-diversity demodulation process the searcher identifies the strongest received multipath signals via correlating known PN sequences with the incoming multipath signal over a range of PN-offsets commonly referred to as a search window. Multipath signal searcher 200 then calculates the received multipath signal energies over the range of pn-offsets, incremented in ½ PN chip steps, for a set of antennas but does not demodulate or decode the information at these offsets. A received multipath signal energy, or energy metric, that exceeds a predetermined energy threshold may indicate that a valid mobile station transmission has been captured at that particular pn-offset.

Multipath signal searcher 200 may be configured such that antennas within a sector are searched serially. After all the antennae have been searched, the searcher outputs the winning energy metrics at their associated pn-offsets. The resulting pn-offsets are then compared in a finger manager to the previously selected pn-offsets. The previously selected pn-offsets may or may not be replaced by one or more of the resulting pn-offsets, depending on the finger assignment algorithm. Accordingly, receiver finger demodulator paths are assigned to track and demodulate multipath signals at the selected pn-offsets.

Generally, in wideband CDMA wireless communication systems, multipath signal searcher 200 despreads multipath signals received at an antenna 102 and assesses their energy levels at corresponding time offsets. Multipath signal searcher uses well known coherent demodulation techniques in order to determine whether or not the incoming signals at a particular time offset are representative of the desired mobile communication signal. Multipath signal searcher 200 includes a RF receiver front-end block 204 for front-end processing. Multipath signal searcher 200 further includes a PN despreader 220, a pilot signal Walsh code despreader 232, and an energy accumulator 230. A plurality of energy metrics output from the plurality of search paths searching at a corresponding plurality of time offsets provides an input to a sorter 250. Sorter 250 selects a best set of time offsets 243 based on the plurality of energy metrics and subsequently forwards best set of time offsets 243 to a finger manager 260 for directing receiver finger tracking and demodulation.

Multipath signal searcher 200 receives a mobile communication signal 107 in the form of multipath replicas via antenna 102. Front-end processing such as intermediate frequency demodulation, analog automatic gain control (AGC), and analog-to-digital (A/D) conversion of mobile communication signal 107 is performed by well known methods and circuits at RF receiver front-end block 204. The analog AGC is typically employed in front of the analog-to-digital (A/D) converter in order to reduce the dynamic operating range of the A/D converter. In addition, RF receiver front-end block 204 further converts the digital signal output from the A/D converter to a set of gain adjusted in-phase (I) and quadrature (Q) components 219.

Set of gain adjusted in-phase (I) and quadrature (Q) components 219 is despread by a pseudo-random noise (PN) despreader 220 which removes a pseudo random code, added to the mobile communication signal prior to transmission by the mobile station. For each gain adjusted in-phase (I) and quadrature (Q) component, PN despreader 220 yields a corresponding combined despread pilot and data in-phase (I) and quadrature (Q) component 223 at a corresponding time offset.

Combined despread pilot and data in-phase (I) and quadrature (Q) components 223 is further despread in pilot signal Walsh code despreader 232 via the removal of a series of Walsh Code zero's to produce a despread pilot signal portion 224. Despread pilot signal portion 224 is representative of the pilot in-phase (I) and quadrature (Q) component of pilot and data in-phase (I) and quadrature (Q) components 223. Despread pilot signal portion 224 is processed by energy accumulator 230 to yield an energy metric 241 for the mobile communication signal at the corresponding time offset.

Energy accumulator 230 includes a cohererent (or complex) accumulator 234, a magnitude squarer 236, and a non-coherent (or real) accumulator 238. Upon receipt by energy accumulator 230, despread pilot signal portion 224 is forwarded to coherent accumulator 234. Coherent accumulator 234 then coherently accumulates despread pilot signal portion 224 at the corresponding time offset to produce a pilot signal in-phase (I) and quadrature (Q) component with an improved signal-to-noise ratio.

Next, the pilot signal in-phase (I) and quadrature (Q) component is input to magnitude squarer 236 which computes an energy of the pilot signal in-phase (I) and quadrature (Q) component to produce a magnitude representative of a pilot signal strength and consequently, has no imaginary component. Non-coherent accumulator 238 then operates to produce energy metric 241 at the corresponding time offset. Sorter 250 sorts and ranks energy metric 241 with a plurality of other energy metrics resulting from other time offset paths to produce best set of time offsets 243, substantially likely to correspond to a plurality time offsets of mobile communication signal 107. Accordingly, best set of time offsets 243 is based solely on energy metrics resulting from despread pilot signal portions at their corresponding plurality of time offsets. Best set of time offsets 243 is then utilized by a finger manager algorithm in finger manager 260 to direct a plurality of receiver finger demodulator paths (shown in connection with FIG. 3) to demodulate mobile communication signal 107 at selected time offsets.

Multipath signal searcher 200 may be implemented using an application specific integrated circuit (ASIC) or using other suitable means.

FIG. 3 is a partial block diagram of a prior art RAKE receiver 300 used for demodulating mobile communication signal 107 and it's multipath replicas at the time offsets selected by multipath signal searcher 200. Generally, RAKE receiver 300 despreads and demodulates received multipath signals at assigned time offsets resulting from mobile station 103. RAKE receiver 300 includes an antenna 102 for receiving incoming signals, and a RF receiver front-end block 204 for front-end processing. RAKE receiver 300 further includes a plurality of receiver finger demodulator paths although only one finger demodulator path 350 is shown in detail. RAKE receiver 300 also includes a combiner 342 for combining a plurality of receiver finger signal streams, for example receiver finger signal stream 356, resulting from the plurality of receiver finger demodulator paths. RAKE receiver 300 further includes a deinterleaver 358 and a decoder 359.

RAKE receiver 300 receives mobile station signal 107 via antenna 102. Front-end processing such as intermediate frequency demodulation, analog automatic gain control (AGC), and analog-to-digital (A/D) conversion of CDMA signal 107 is performed by well known methods and circuits at RF receiver front-end block 204. In addition, RF receiver front-end block 204 further converts the digital signal, output from the A/D converter, to a set of gain adjusted in-phase (I) and quadrature (Q) components 219.

Set of gain adjusted in-phase (I) and quadrature (Q) components 219 at an assigned time offset is input to receiver finger demodulator path 350 for transformation into receiver finger signal stream 356. Receiver finger demodulator path 350 includes a finger PN despreader 351, a pilot signal Walsh code despreader 332, a data signal Walsh code despreader 360, and a finger data signal demodulator 354. Set of gain adjusted in-phase (I) and quadrature (Q) components 219 received by receiver finger demodulator path 350 is despread by finger PN despreader 351 which removes a pseudo random code added to mobile communication signal 107 prior to transmission by mobile station 103. For each gain adjusted in-phase (I) and quadrature (Q) component, finger PN despreader 351 yields a corresponding combined finger despread pilot and data in-phase (I) and quadrature (Q) components 353 at the assigned time offset. The assignment of the assigned time offset is directed by finger manager 260 based on the best set of time offsets selected by sorter 250.

Finger despread pilot and data in-phase (I) and quadrature (Q) components 353 are forwarded to pilot signal Walsh code despreader 332 for despreading to produce a finger despread pilot signal portion 324. Similarly, finger despread pilot and data in-phase (I) and quadrature (Q) components 353 are forwarded to data signal Walsh code despreader 360 for despreading to produce a finger despread data signal portion 361. Finger despread pilot signal portion 324 and finger despread data signal portion 361 are then demodulated in finger data signal demodulator 354 to produce a receiver finger signal stream at the assigned time offset. Finger data signal demodulator 354 includes a channel estimator 362, and a complex multiplier 364. Finger despread pilot signal portion 324 received by channel estimator 362 is utilized to estimate a phase angle 363 associated with finger despread pilot signal portion 324. The phase angle results from a propagation delay associated with mobile communication signal 107. A conjugate of resulting phase angle 363 is multiplied with finger despread data signal portion 361 in complex multiplier 364 to yield receiver finger signal stream 356 at the assigned time offset.

Combiner 342 then combines receiver finger signal stream 356 with other receiver finger signal streams resulting from additional receiver finger demodulator paths such as receiver finger demodulator path 370. A combined signal symbol stream 344 that is composed of an estimate of transmitted channel symbols, is received by deinterleaver 358. Deinterleaver 358 restores an order to combined signal symbol stream 344 to yield a sequence of deinterleaved transmitted channel symbols representative of the mobile communication signal 107. The sequence of deinterleaved transmitted channel symbols are input to a decoder 359 which estimates a sequence of information bits from the sequence of deinterleaved transmitted channel symbols and outputs a decoded signal 380 representative of mobile communication signal 107. RAKE receiver 300 may be implemented using an application specific integrated circuit (ASIC) or using other suitable means.

Figure 4:
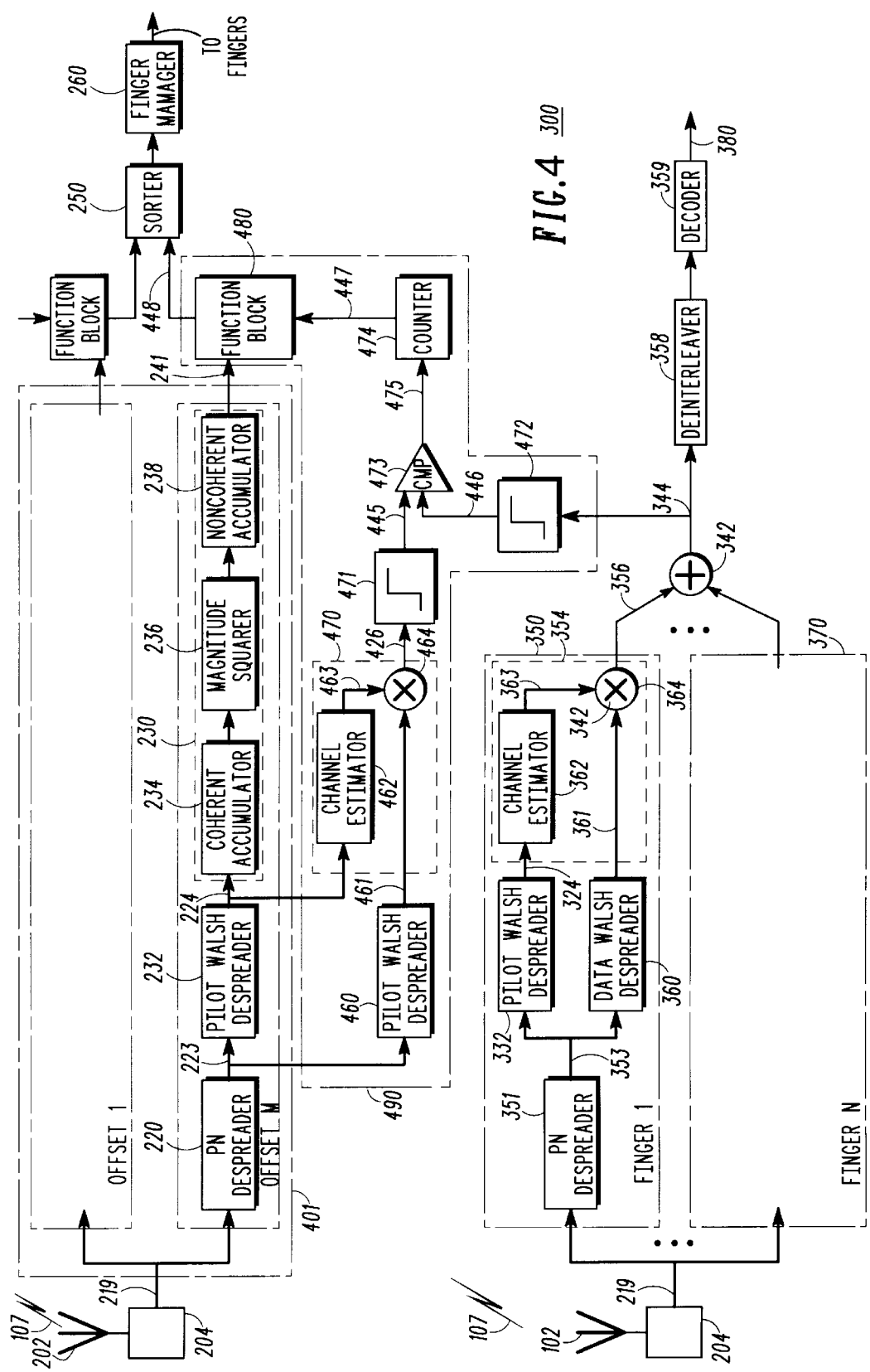
FIG. 4 is a block diagram of a base station receiver assembly 400 which includes multipath signal searcher 200, RAKE receiver 300 and an energy adjustment generator 490, according to a preferred embodiment of the present invention.

FIG. 4 is a block diagram of a base station receiver assembly 400 which includes multipath signal searcher 200, RAKE receiver 300 and an energy adjustment generator 490, according to a preferred embodiment of the present invention. Energy adjustment generator 490 produces an energy correction to energy metric 241, forming a signal 448 forwarded to sorter 250. As a result, energy adjustment generator 490 provides an increased multipath detection probability over that which is achieved using only the energy metric alone. According to the preferred embodiment of the present invention, the energy correction is based on a symbol match count (SMC) resulting from a comparison of outputs from multipath signal searcher 200 with outputs from RAKE receiver 300.

Energy adjustment generator 490 includes a data Walsh depreader 460, a data signal demodulator 470, a first binary clipper 471, a second binary clipper 472, a comparator 473, a counter 474, and a function block 480. Energy adjustment generator 490, which may be implemented in using any number of suitable methods, operates in concert with multipath signal searcher 200 and RAKE receiver 300 to generate the symbol match count as follows. A gain adjusted set of in-phase (I) and quadrature (Q) components 219 resulting from receiving and gain adjusting mobile communication signal 107 by receiver front end 204 is received by PN despreader 220. It is contemplated that multiple PN despreaders, despreading at a specific time offset in the search window, or a single PN despreader, despreading itteratively across the search window, may be utilized. As discussed in connection with FIG. 2, PN despreader 220, despreading at a specific PN offset, yields a combined despread pilot and data in-phase (I) and quadrature (Q) components 223 at a corresponding time offset. Combined despread pilot and data in-phase (I) and quadrature (Q) components 223 is input to data Walsh code despreader 460 which removes a Walsh code associated with spreading the data signal prior to transmission, thereby yielding a despread data signal portion 461. Similarly, despread pilot signal portion 224 resulting from pilot Walsh depreader 232 is received by a data signal demodulator 470. Data signale demodulator 470 then demodulates despread pilot signal portion 224 to produce a signal stream 426.

Data signal demodulator 470 includes a channel estimator 462 and a complex multiplier 464. Despread pilot signal portion 224 input to data signal demodulator 470 is received by channel estimator 462. Channel estimator 462 estimates a phase angle 463 associated with despread signal portion 224. Phase angle 463 of a multipath signal transmitted from mobile station 103 is indicative of a mobile communication signal delay. A de-rotation of the multipath ray, equivalent to phase angle 463, results in an ability to compare transmitted channel symbols output from receiver fingers with transmitted channel symbols processed in multipath searcher 200. A conjugate of phase angle 463 is multiplied by despread signal portion 461 in complex multiplier 464, yielding a signal stream 426. Accordingly, signal stream 426 is representative of transmitted channel symbols, de-rotated such that a comparison of the transmitted channel symbols with a combined receiver finger signal stream is feasible over the predetermined time period.

Signal stream 426 is converted in first binary clipper 471 to produce a first binary signal stream 445. Similarly, combined signal symbol stream 344 output from a plurality of receiver finger demodulator paths is converted in second binary clipper 472 to produce a second binary signal stream 446. First binary signal stream 445 is comprised of symbols representative of an estimate of mobile communication signal 107 at the corresponding time offset. Second binary signal stream 446 is comprised of symbols representative of an estimate of mobile communication signal 107 at the time offsets assigned by finger manager 260.

First binary signal stream 445 and second binary signal stream 446 are compared in comparator 473 which yields a value of one when two corresponding symbols from first and second binary streams are identical. Comparator 473 yields a value of zero when two corresponding symbols from the first and second binary streams are not identical. If an accurate selection of the time offset was previously made by multipath signal searcher 200, then first binary signal stream 445 will be substantially identical to second binary signal stream 446, for the time period.

Counter 474 then receives an output 475 from comparator 473 and operates to count the number of times comparator 473 yielded the value of one in the time period. As a result of operation of counter 474, symbol match count 447 is generated. Symbol match count 447 is representative of a likelihood that the corresponding time offset for the time period contains mobile communication signal 107. Symbol match count 447 is added to energy metric 241 at function block 480 to yield, as output, signal 448 for use by sorter 250. Signal 448 is composed of an adjusted energy value. Thus, symbol match count 447 provides a weighting function to the inputs received by sorter 250, thereby resulting in a best set of time offsets 443. Accordingly, best set of time offsets 443 is substantially more accurate than best set of time offsets 243, generated as a result of only energy metric 241 provided in the prior art design.

Function block 480 may be implemented using any suitable method such as a software algorithm or an application specific integrated circuit. For example, function block 480 may generate signal 448 using an example algorithm as follows:

Adjusted Energy($m$)=Energy($m$)+$f$(SMC($m$)), $m=1,2 \ldots M$ where f is a monotonically non-decreasing function and M is the total number of time offsets required to be searched.

The total M offsets are sorted in descending order according to the adjusted energy values of signals input to sorter 250, such as signal 448. Therefore a signal received by multipath signal searcher 200 which has a low energy value 241 but is determined to have a high SMC 447 may be accepted as a candidate for receiver finger assignment by finger manager 260. As a result, weak mobile communication signals are more likely to be detected, and the capability of multipath signal searcher 200 to select corresponding time offsets at which successful receiver demodulation may occur, is enhanced.

The cdma2000 system and its application in wideband CDMA systems has been specifically referred to herein, but the present invention is applicable to any coherent CDMA wireless communication system.

The principles of the present invention which apply to a cellular-based digital communication system, include but are not limited to personal communicating systems, trunked systems, satellite systems and data networks. Likewise, the principles of the present invention which apply to all types of digital radio frequency channels also apply to other types of communication channels, such as radio frequency signaling channels, electronic data buses, wireline channels, optical fiber links and satellite links.

It will furthermore be apparent that other forms of the invention, and embodiments other than the specific embodiments described above, may be devised without departing from the spirit and scope of the appended claims and their equivalents.

What we claim is:

1. A multipath searcher for use in a coherent code division multiple access (CDMA) wireless communication system conveying a mobile communication signal, the multipath searcher including a plurality search paths searching at a corresponding plurality time offsets for the mobile communication signal, the multipath searcher comprising:

a PN despreader having as input a set of in-phase (I) and quadrature (Q) components, and outputting a combined set of despread pilot and data in-phase (I) and quadrature (Q) components at a corresponding time offset;

a pilot signal Walsh code despreader having as input the combined set of despread pilot and data in-phase (I) and quadrature (Q) components, and outputting a pilot signal portion;

an energy accumulator for receiving, during a time period, the pilot signal portion, and outputting a corresponding energy metric at the corresponding time offset; and an energy adjustment generator having as inputs, the energy metric, the combined set of pilot and data in-phase (I) and quadrature (Q) components, the pilot signal portion, and a combined signal symbol stream from a RAKE receiver, for generating a signal representative of a likelihood that the corresponding time offset corresponds to a valid time offset of the mobile communication signal.

2. The multipath searcher according to claim 1, wherein the signal is comprised of an adjusted energy value.

3. The multipath searcher according to claim 1, wherein the energy adjustment generator comprises:

a data signal Walsh code despreader for receiving the combined set of despread pilot and data in-phase (I) and quadrature (Q) components and outputting a data signal portion;

a data signal demodulator for demodulating the data signal portion using the pilot signal portion to produce a signal stream, the signal steam comprised of symbols;

a first binary clipper for converting the signal steam into a first binary signal stream, the first binary signal stream comprising a first plurality of symbols representing the mobile communication signal at the corresponding time offset;

a second binary clipper for converting the combined signal symbol stream into a second binary stream, the second binary signal stream comprising a second plurality of symbols representing the mobile communication signal;

a comparator for comparing the first binary signal stream to the second binary signal stream to produce a value;

a counter for counting a number of times the comparator yielded the value in the time period, and outputting a symbol match count, the symbol match count representative of a likelihood that the corresponding time offset corresponds to a valid time offset of the mobile communication signal, for the time period; and a function block for adding the symbol match count to the energy metric to yield the signal.

4. The multipath searcher according to claim 3, wherein the comparator yields a value of one when two corresponding symbols from the first and second binary streams are identical, and yields a value of zero when two corresponding symbols from the first and second binary streams are not identical.

5. The multipath searcher according to claim 3, wherein the data signal Walsh code despreader further comprises a means for removing a Walsh code associated with spreading the data signal portion prior to transmission of the mobile communication signal.

6. The multipath searcher according to claim 3, wherein the data signal demodulator comprises:

a channel estimator for estimating a phase angle associated with the pilot signal portion, the phase angle resulting from a mobile communication signal delay; and a complex multiplier for multiplying the data signal portion with a conjugate of the phase angle to yield the signal stream.

7. The multipath searcher according to claim 3, wherein the CDMA wireless communication system receiver further comprises:

a sorter having as inputs the signal and a plurality of other signals corresponding at a plurality of other time offsets, the sorter sorting and ranking the signal with the plurality of other signals to produce a best set of time offsets substantially likely to correspond to a plurality of valid time offsets associated with the mobile communication signal;

a finger manager for directing a plurality of receiver finger demodulator paths to demodulate the mobile communication signal based on the best set of time offsets;

a combiner for combining a receiver finger signal stream with a plurality of other receiver finger signal streams at a plurality of other time offsets to yield a combined signal symbol stream comprising an estimate of transmitted channel symbols;

a deinterleaver for restoring an order to the combined signal symbol stream and outputting a sequence of deinterleaved transmitted channel symbols representative of the mobile communication signal; and a decoder for estimating a sequence of information bits from the sequence of deinterleaved transmitted channel symbols and outputting a decoded signal substantially identical to the mobile communication signal.

8. The multipath searcher according to claim 7, wherein the first binary signal stream and the second binary signal stream are substantially identical for the time period at the best set of time offsets.

9. The multipath searcher according to claim 7, wherein each of the plurality of receiver finger demodulator paths further comprises:

a finger PN despreader having as input the set of in-phase (I) and quadrature (Q) components resulting from receiving and gain adjusting the mobile communication signal by a receiver front end, and outputting a combined set of finger despread pilot and data in-phase (I)

and quadrature (Q) components at one of a plurality of assigned time offsets, the assignment of the one of the plurality of assigned time offsets directed by the finger manager based on the best set of time offsets;

a pilot signal Walsh code despreader for despreading the combined set of finger despread pilot and data in-phase (I) and quadrature (Q) components to produce a finger pilot signal portion;

a data signal Walsh code despreader for despreading the combined set of finger despread pilot and data in-phase (I) and quadrature (Q) components to produce a finger data signal portion; and a finger data signal demodulator for receiving the finger pilot signal portion and the finger data signal portion, and outputting a receiver finger signal stream at the one of the plurality of assigned time offsets.

10. The multipath searcher according to claim 9, wherein the finger data signal demodulator further comprises:

a channel estimator for estimating a phase angle associated with the finger pilot signal portion, the phase angle resulting from a mobile communication signal delay; and a complex multiplier for multiplying the finger data signal portion with a conjugate of the phase angle to yield the receiver finger signal stream at the one of the plurality of assigned time offsets.

11. The multipath searcher according to claim 1, wherein the energy accumulator further comprises:

a coherent accumulator for coherently accumulating the pilot signal portion at the corresponding time offset to produce a pilot signal in-phase (I) and quadrature (Q) component with an increased signal-to-noise ratio;

a magnitude squarer for computing an energy of the pilot signal in-phase (I) and quadrature (Q) component to produce a magnitude representative of a pilot signal strength; and a non-coherent accumulator for non-coherently accumulating the magnitude to produce the corresponding energy metric at the corresponding time offset.

12. An energy adjustment generator for use in a coherent code division multiple access (CDMA) wireless communication system conveying a mobile communication signal, the coherent code CDMA wirless communication system including a multipath signal searcher and a RAKE receiver for receiving a mobile communication signal, the energy adjustment generator comprising:

a data signal Walsh code despreader for receiving a combined set of despread pilot and data in-phase (I) and quadrature (Q) components from the multipath signal searcher and outputting a data signal portion at a corresponding time offset;

a data signal demodulator for receiving the data signal portion and a pilot signal portion from the multipath signal searcher, and outputting a signal stream;

a first binary clipper for converting the signal steam into a first binary signal stream, the first binary signal stream comprising a first plurality of symbols representing the mobile communication signal at the corresponding time offset;

a second binary clipper for converting a combined signal symbol stream, resulting from a plurality of receiver finger signal streams, into a second binary stream, the second binary signal stream comprising a second plurality of symbols representing the mobile communication signal;

a comparator for comparing the first binary signal stream to the second binary signal stream to produce a value;

a counter for counting a number of times the comparator yielded the value in the time period, and outputting a symbol match count, the symbol match count representative of a likelihood that the corresponding time offset corresponds to a valid time offset of the mobile communication signal, for a time period; and a function block for adding the symbol match count to an energy metric produced by the multipath signal searcher, to yield a signal representative of a likelihood that the corresponding time offset corresponds to a valid time offset of the mobile communication signal.

13. The energy adjustment generator according to claim 12, wherein the signal is comprised of an adjusted energy value.

14. The energy adjustment generator according to claim 12, wherein the comparator yields a value of one when two corresponding symbols from the first and second binary streams are identical, and yields a value of zero when two corresponding symbols from the first and second binary streams are not identical.

15. The energy adjustment generator according to claim 14, wherein the first binary signal stream and the second binary signal stream are substantially identical at the valid time offset of the mobile communication signal, for the time period.

16. A method for performing a mobile communication signal search using a multipath searcher in a coherent code division multiple access (CDMA) wireless communication system, the multipath searcher including a plurality search paths searching for the mobile communication signal at a corresponding plurality time offsets, the method comprising:

PN despreading a set of in-phase (I) and quadrature (Q) components resulting from receiving and gain adjusting the mobile communication signal to yield a combined set of despread pilot and data in-phase (I) and quadrature (Q) components at a corresponding time offset;

Walsh despreading the combined set of despread pilot and data in-phase (I) and quadrature (Q) components to yield a data signal portion;

Walsh despreading the combined set of despread pilot and data in-phase (I) and quadrature (Q) components to yield a pilot signal portion;

processing, over a time period, the pilot signal portion to produce a corresponding energy metric at the corresponding time offset;

demodulating the data signal portion using the pilot signal portion to produce a signal stream, the signal steam comprised of symbols;

converting the signal steam into a first binary signal stream by a first binary clipper;

converting a combined signal symbol stream resulting from a plurality of receiver finger signal streams, into a second binary signal stream by a second binary clipper;

comparing two corresponding symbols from the first binary signal stream and the second binary signal stream by a comparator, the comparator yielding a value of one when the two corresponding symbols are identical and yielding a value of zero when the two corresponding symbols are not identical;

counting a number of times the comparator yielded a value of one in the time period by a counter, and outputting a symbol match count, the symbol match count representative of a likelihood that the corresponding time offset for the time period contains a significant mobile communication signal energy;

adding the match symbol count to the energy metric by a function block to produce a signal representative of a likelihood that the corresponding time offset contains a significant mobile communication signal energy, the signal comprised of an adjusted energy value.

17. A method for performing a mobile communication signal search according to claim 16, further comprising:

sorting and ranking the signal with a plurality of other signals which resulted from searching at other time offsets, by a sorter to produce a best set of time offsets;

directing the plurality of receiver finger demodulator paths to demodulate the mobile communication signal based on the best set of time offsets;

combining a receiver signal stream at the corresponding time offset with the plurality of receiver finger signal streams to yield the combined signal symbol stream the combined signal symbol stream comprised of a sequence of transmitted channel symbols;

restoring an order to the combined signal symbol stream, and outputting a sequence of deinterleaved transmitted channel symbols; and estimating a plurality of information bits from the deinterleaved transmitted channel symbols and outputting a decoded signal substantially identical to the mobile communication signal.

18. A method for performing a mobile communication signal search according to claim 17, wherein the first and second binary signal streams are substantially identical for the time period at the best set of time offsets.

* * * * *